US012104895B2

(12) United States Patent
Corghi

(10) Patent No.: US 12,104,895 B2
(45) Date of Patent: Oct. 1, 2024

(54) METHOD FOR ALIGNING A VEHICLE SERVICE SYSTEM RELATIVE TO A VEHICLE

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 620 days.

(21) Appl. No.: 17/191,065

(22) Filed: Mar. 3, 2021

(65) Prior Publication Data
US 2021/0278203 A1    Sep. 9, 2021

(30) Foreign Application Priority Data
Mar. 6, 2020  (IT) .................. 102020000004834

(51) Int. Cl.
| G01B 11/00 | (2006.01) |
| G01B 11/275 | (2006.01) |
| H04N 7/18 | (2006.01) |
| H04N 23/90 | (2023.01) |

(52) U.S. Cl.
CPC ........... *G01B 11/2755* (2013.01); *H04N 7/18* (2013.01); *H04N 23/90* (2023.01); *G01B 2210/12* (2013.01); *G01B 2210/14* (2013.01); *G01B 2210/303* (2013.01); *G01B 2210/306* (2013.01)

(58) Field of Classification Search
CPC . G06T 7/80; G01S 7/40; G01S 7/4972; G01S 7/52004; G01S 7/4026; G01S 7/4082; G01S 13/931; G01B 11/2755; G01B 2210/12; G01B 2210/14; G01B 2210/303; G01B 2210/306
See application file for complete search history.

(56) References Cited

U.S. PATENT DOCUMENTS

| 7,121,011 B2 | 10/2006 | Murray et al. |
| 7,382,913 B2 | 6/2008 | Dorranc et al. |
| 7,424,387 B1 | 9/2008 | Gill et al. |
| 8,244,024 B2 | 8/2012 | Dorrance et al. |
| 11,538,188 B1 * | 12/2022 | Cejka ........................ G06T 7/80 |
| 2004/0049930 A1 * | 3/2004 | Murray .................. G01B 11/27 33/288 |

(Continued)

*Primary Examiner* — Anne Marie Antonucci
*Assistant Examiner* — Jordan T Smith
(74) *Attorney, Agent, or Firm* — Pearne & Gordon LLP; Bryan M. Gallo

(57) ABSTRACT

Described is a method for aligning a vehicle service system (1) relative to a vehicle (2) positioned in a service area (8), where the vehicle service system (1) comprises: a calibration structure (3) for calibrating an ADAS sensor of an advanced driver assistance system of the vehicle (2); an apparatus (4) for measuring the alignment of the vehicle (2) and on which an apparatus camera (41) is mounted; wherein the method comprises the following steps: applying a front wheel target (51) and a rear wheel target (52) on a front wheel and on a rear wheel of the vehicle (2); capturing an image through the apparatus camera (41), wherein the image represents the front wheel target (51) and the rear wheel target (52); processing the image to derive information useful for positioning the calibration structure (3) relative to the vehicle (2); placing a positioning device (7) at an operating position, spaced from the calibration structure (3), in front of the apparatus (4) and alongside the first side of the vehicle (2).

21 Claims, 6 Drawing Sheets

(56) References Cited

U.S. PATENT DOCUMENTS

| | | | |
|---|---|---|---|
| 2005/0041847 A1* | 2/2005 | Dorrance | G01B 11/2755 356/139.09 |
| 2005/0096807 A1 | 5/2005 | Murray | |
| 2008/0186383 A1 | 8/2008 | Dorrance et al. | |
| 2018/0052223 A1* | 2/2018 | Stieff | G01B 11/026 |
| 2018/0053320 A1* | 2/2018 | Kunert | G06T 7/60 |
| 2020/0096607 A1* | 3/2020 | Okubo | G01B 11/2755 |
| 2021/0285760 A1* | 9/2021 | Su | G06T 7/80 |
| 2021/0387637 A1* | 12/2021 | Rogers | H04W 4/48 |
| 2022/0012912 A1* | 1/2022 | Cejka | H04N 23/54 |

* cited by examiner

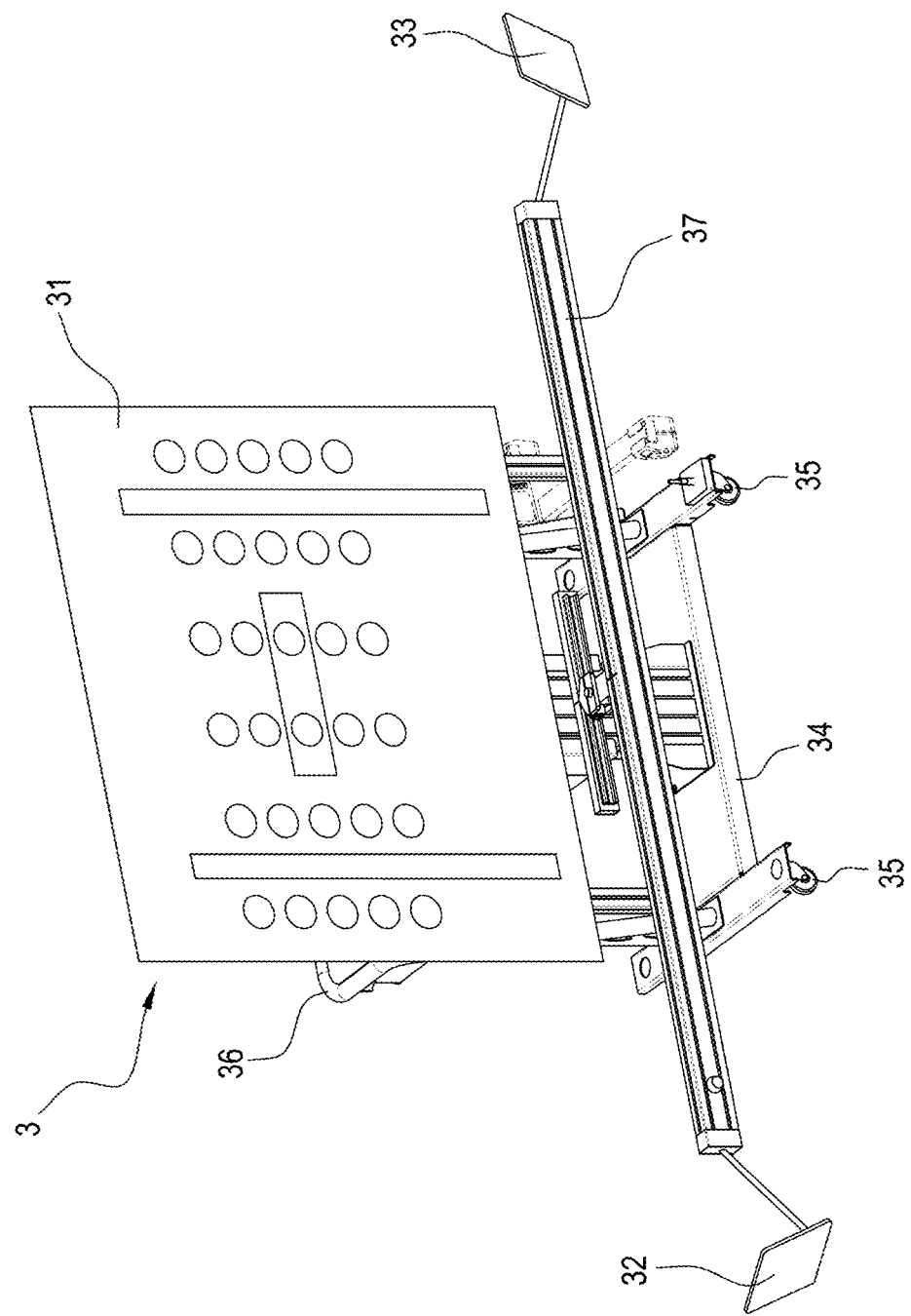

METHOD FOR ALIGNING A VEHICLE SERVICE SYSTEM RELATIVE TO A VEHICLE

This invention relates to a method for aligning a vehicle service system relative to a vehicle and to a vehicle service system.

In the field of vehicle service systems, systems are known which comprise an apparatus for measuring the alignment of the vehicle, used to check the alignment of the vehicle wheels, and a calibration structure, used to calibrate an ADAS sensor of an advanced driver assistance system of a vehicle. Examples of these systems are described, for example, in the following patent documents: U.S. Pat. No. 8,244,024B2, U.S. Pat. No. 7,382,913B2, U.S. Pat. No. 7,121,011B2, U.S. Pat. No. 7,424,387B2, US2004/049930A1, US2005/096807A1.

In these systems, both the apparatus for measuring the alignment and the calibration structure must be positioned precisely relative to the vehicle. Positioning is performed with the aid of optical devices (cameras) and targets, which are associated with the apparatus for measuring the alignment of the vehicle, with the calibration structure and/or with the vehicle. For example, document U.S. Pat. No. 8,244,024B2 discloses an embodiment where the alignment measuring apparatus mounts four cameras which view four targets on the wheels, and the calibration structure mounts another two cameras which also view two of the four targets on the wheels, and another embodiment where the alignment measuring apparatus mounts six cameras, four of which view the four targets on the wheels and the other two of which view targets on the calibration structure.

This system requires a large number of cameras, which means high cost.

There is therefore a need for a system which allows precise alignment relative to the vehicle but which, at the same time, is simple and inexpensive.

This disclosure has for an aim to provide a method for aligning a vehicle service system relative to a vehicle and a vehicle service system to overcome at least one of the above mentioned drawbacks of the prior art.

This aim is fully achieved by the method for aligning a vehicle service system relative to a vehicle and by the vehicle service system of this disclosure, as characterized in the appended claims.

According to an aspect of it, this disclosure relates to a method for aligning a vehicle service system relative to a vehicle. The vehicle is positioned in a service area; by "service area" is meant any area which can receive the vehicle—in a vehicle repair shop, for example; the service area may be provided with marks or guides to assist with vehicle positioning.

The service system comprises a calibration structure. The calibration structure includes a calibration assistance device, configured to calibrate an ADAS sensor of an advanced driver assistance system of the vehicle.

In an embodiment, the ADAS sensor of the vehicle is a camera; for example, the ADAS sensor may be a camera responsible for detecting a change of lane or a camera responsible for detecting the proximity of an object (for example, a pedestrian or another vehicle). In this case, the calibration assistance device is a panel bearing a predetermined combination of graphical features. In an embodiment, the ADAS sensor is a radar sensor. In this case, the calibration assistance device is a reflector panel or a mirror or a prism. In an embodiment, the ADAS sensor is an ultrasonic sensor. In an embodiment, the ADAS sensor is a LIDAR sensor.

The calibration structure includes an apparatus for measuring the alignment of the vehicle (hereinafter: apparatus); mounted on the apparatus is a camera for capturing images. The apparatus is distinct and separate from the calibration structure.

The method comprises a step of applying a front wheel target and a rear wheel target on a front wheel and on a rear wheel of the vehicle, respectively. The front and rear wheel targets bear (respective) combinations of graphical features. The combinations of graphical features appearing on the front wheel target and on the rear wheel target may be the same or different. The front wheel target and the rear wheel target may be the same or different in size. The front wheel target and the rear wheel target are fixed to the front wheel and to the rear wheel, respectively. More specifically, the front wheel target and the rear wheel target may be fixed to the rims and/or to the tyres of the front wheel and of the rear wheel. The front wheel and the rear wheel are located on a first side of the vehicle.

The method comprises a step of positioning the calibration structure at a position in front of the vehicle; the method also comprises a step of positioning the apparatus. Preferably, the calibration structure and the apparatus are positioned in such a way that the calibration structure is interposed between the apparatus and the vehicle. The calibration structure and the apparatus are not necessarily positioned simultaneously.

It should be noted that this step of positioning is a step of preliminary positioning (at least for the calibration structure).

The method comprises a step of capturing an image through the apparatus camera. The image represents the front wheel target and the rear wheel target.

It should be noted that in the context of this disclosure, express reference is made to capturing an image through a camera; instead of each camera described in this disclosure, however, there may be a plurality of cameras connected to each other in a stereo configuration, capturing a plurality of images which are then processed to derive the image.

It should be noted that the calibration structure may be positioned at the position in front of the vehicle before or after the image representing the front wheel target and the rear wheel target is captured; more specifically, in the case where the calibration structure can cover the front wheel target and/or the rear wheel target, it is positioned after the image is captured.

The method comprises a step of processing the image to derive information useful for positioning the calibration structure relative to the vehicle; this step of processing is performed by a control unit. This information may be communicated to an operator, who moves the calibration structure to position it relative to the vehicle at a position complying with the manufacturer's specifications for calibrating the ADAS sensor; thus, the step of preliminary positioning is followed by a step of precise positioning based on the image captured by the camera. This step of positioning may be performed by the operator, assisted by the control unit, or it may be automated; in effect, the calibration structure may be self-propelled, driven by the control unit.

Preferably, the method comprises a step of placing a positioning device. The positioning device is placed at an operating position. The operating position is spaced from the calibration structure, in front of the apparatus and/or alongside the first side of the vehicle. Mounted on the positioning device is a device target; the device target bears a respective combination of graphical features.

It should be noted that the positioning device may be placed at its operating position before or after the Image of the front wheel target and the rear wheel target is captured by the apparatus camera; more specifically, in the case where the positioning device at its operating position covers the front wheel target and/or the rear wheel target, the positioning device is placed at the operating position after the image is captured, so as not to hide the rear wheel target.

The method comprises a step of viewing the device target, mounted on the positioning device, through the apparatus camera. In an embodiment, the apparatus camera simultaneously views the rear wheel target, the front wheel target and the device target (which are effectively distinct targets), so the first image represents the rear wheel target, the front wheel target and the device target. In another embodiment, either the front wheel target or the rear wheel target is moved onto the positioning device (so the positioning device target coincides with either the front wheel target or the rear wheel target). The method then comprises a step of capturing the image representing the front wheel target and the rear wheel target and, at another (preceding or following) time instant, a step of capturing an additional image representing the device target and the other of either the front wheel target or the rear wheel target (which remains applied on the wheel); the two images are then processed to derive first image data representing the front wheel target, the rear wheel target and the device target.

The method may further comprise:
i) a step of viewing the device target, through a structure camera which is associated with the calibration structure, and/or (alternatively or in addition).
ii) a step of viewing a structure target associated with the calibration structure, through a device camera which is associated with the positioning device.

In case i), the structure camera captures a (third) image, representing the device target, which is processed together with the first image to derive the information useful for positioning the structure relative to the vehicle.

In case ii), the device camera captures a (fourth) image, representing the structure target, which is processed together with the first image to derive the information useful for positioning the structure relative to the vehicle.

The structure target may be an additional target or it may be one of either the front wheel target or the rear wheel target which, after the image is captured, is moved onto the structure.

In an embodiment, the apparatus has an additional camera mounted on it. More specifically, in an embodiment, the apparatus might include a frame on which both the camera and the additional camera are mounted; in another embodiment, the camera and the additional camera are mounted on respective structures (columns, for example) spaced from each other.

The method comprises a step of applying an additional front wheel target and an additional rear wheel target on an additional front wheel and on an additional rear wheel of the vehicle, respectively; the additional front wheel and the additional rear wheel are located on a second side of the vehicle, opposite to the first side.

The method comprises a step of positioning an additional positioning device at an additional operating position; the additional operating position is spaced from the calibration structure, in front of the apparatus and/or alongside the second side of the vehicle. Mounted on the additional positioning device is an additional device target.

The method comprises a step of capturing a second image through the additional camera. The second image represents the additional front wheel target and the additional rear wheel target. It should be noted that the additional positioning device may be placed at its operating position before or after the image of the additional front wheel target and of the additional rear wheel target is captured by the additional apparatus camera; more specifically, in the case where the additional positioning device at its operating position covers the additional front wheel target and/or the additional rear wheel target, the additional positioning device is placed at the operating position after the second Image is captured, so as not to hide the additional rear wheel target.

It should be noted that the calibration structure may be positioned at the position in front of the vehicle before or after the second image is captured; more specifically, in the case where the calibration structure can cover the additional front wheel target and/or the additional rear wheel target, it is positioned after the second image is captured.

The method comprises a step of viewing the additional device target of the additional device through the additional apparatus camera. In an embodiment, the additional camera simultaneously views the additional front wheel target, the additional rear wheel target and the additional device target. Thus, the second image also represents the additional device target. In another embodiment, either the additional front wheel target or the additional rear wheel target is moved onto the additional positioning device (so, in practice, the additional positioning device target coincides with either the additional front wheel target or the additional rear wheel target). The method then comprises a step of capturing the image representing the additional front wheel target and the additional rear wheel target and, at another (preceding or following) time instant, a step of capturing an additional image representing the additional device target and the other between the additional front wheel target and the additional rear wheel target (which remains applied on the wheel); the two images are then processed to derive second image data representing the additional front wheel target, the additional rear wheel target and the additional device target.

Thus, the second image (or the second image data) is processed together with the first image (or the first image data) to derive the information useful for positioning the calibration structure relative to the vehicle. In other words, the information useful for positioning the calibration structure relative to the vehicle is derived also as a function of the second image.

Preferably, what is described in connection with the positioning device also applies, with the necessary changes made, to the additional positioning device. More specifically, in an embodiment, an additional structure target may be mounted on the calibration structure. The additional structure target is viewable by an additional device camera mounted on the additional positioning device. The method further comprises a step of viewing the additional structure target through the additional device camera. That way, the additional device camera captures a (sixth) image representing the additional structure target, which is processed to derive the information useful for positioning the calibration structure relative to the vehicle.

In an embodiment, the calibration structure may have mounted on it an additional structure camera facing towards the positioning device.

More generally speaking, the method may comprise:
- a step of viewing the additional device target, through the additional structure camera which is associated with the calibration structure, in order to capture a (fifth) image representing the additional device target, or alternatively or in addition,
- a step of viewing the additional structure target associated with the calibration structure, through the additional device camera which is associated with the additional positioning device, in order to capture the (sixth) image.

In an embodiment, the method comprises, after the step of capturing the image (first image), a step of moving the front wheel target and/or the rear wheel target onto the positioning device, to define the device target, or onto the structure, to define the structure target.

Similarly, in an embodiment, the method comprises, after the step of capturing the second image, a step of moving the additional front wheel target and/or the additional rear wheel target onto the additional positioning device, to define the additional device target, or onto the structure, to define the additional structure target.

Preferably, the device camera is at a predetermined position relative to the device target. Similarly, the additional device camera is at a predetermined position relative to the additional device target. The calibration panel is at a predetermined position relative to the structure target.

It should be noted that, preferably, the vehicle is operatively interposed between the positioning device and the additional positioning device, which are located at the operating position and at the additional operating position, respectively.

Furthermore, in an embodiment, the positioning device may have a rear device camera mounted on it; the rear camera device may be provided either in combination with the device camera or without the device camera; the rear device camera is oriented opposite to the device camera (if present). Thus, the device may include a step of positioning a rear calibration structure at a position behind the vehicle. The rear calibration structure is positioned in such a way that the vehicle is interposed between the apparatus (or the calibration structure) and the rear calibration structure. The rear calibration structure includes a rear calibration assistance device, configured to calibrate a rear ADAS sensor of an advanced driver assistance system of the vehicle (for example, a parking aid sensor or camera).

A rear structure target may be mounted on the rear calibration structure.

Thus, the method includes a step of viewing the rear structure target through the rear device camera. That way, the rear device camera captures a seventh image representing the rear structure target, which is processed to derive the information useful for positioning the rear calibration structure relative to the vehicle.

Similarly, an additional rear structure target may be mounted on the rear calibration structure and the additional device may be provided with a rear camera; thus, the method may include a step of viewing the additional rear structure target through the rear camera of the additional device. That way, the rear camera of the additional device captures an eighth image representing the additional rear structure target, which is processed to derive the Information useful for positioning the rear calibration structure relative to the vehicle.

The rear calibration structure may also be provided with a rear structure camera, which views the device target (or an additional device target, oriented opposite to the device target). That way, the rear structure camera captures an eighth image representing the device target (or the additional device target), which is processed to derive the information useful for positioning the rear calibration structure relative to the vehicle. Similarly, the rear calibration structure may be provided with an additional rear structure camera, which views the rear device target (or an additional rear device target, oriented opposite to the additional device target). That way, the additional rear structure camera captures a ninth image representing the additional device target (or the additional target of the additional device), which is processed to derive the information useful for positioning the rear calibration structure relative to the vehicle.

In an embodiment, the device target may be a three-dimensional target, including a first face, which is viewed by the apparatus camera, and a second face, which is viewed by the structure camera. In an embodiment, the device target may be a three-dimensional target, including a first face, which is viewed by the additional apparatus camera, and a second face, which is viewed by the additional structure camera.

In an embodiment, the device target may include a first panel, which Is viewed by the apparatus camera, and a second panel, which is viewed by the structure camera. Similarly, the additional device target may also include a first panel, which is viewed by the additional apparatus camera, and a second panel, which is viewed by the additional structure camera.

These embodiments wherein the device target is a three-dimensional target or includes a first and a second panel are combinable and compatible with the embodiments wherein on the positioning device a rear device camera is mounted, to see a rear calibration structure.

This disclosure also provides a vehicle service system. The system comprises a calibration structure. The calibration structure includes a calibration assistance device, configured to calibrate an ADAS sensor of an advanced driver assistance system of a vehicle.

The system includes an apparatus for measuring the alignment of the vehicle.

The system comprises an apparatus camera, mounted on the apparatus, for capturing images.

The system comprises a front wheel target and a rear wheel target.

Preferably, the front wheel target and the rear wheel target bear respective combinations of graphical features. The front wheel target and the rear wheel target are configured to be applied on a front wheel and on a rear wheel of the vehicle, respectively.

The system comprises a control unit. The control unit is configured to process an image representing the front wheel target and the rear wheel target. The image is captured by the apparatus camera, in an operating configuration in which the apparatus is in front of the vehicle (and the calibration structure is preferably also in front of the vehicle). The control unit is configured to derive, as a function of that image, information useful for positioning the calibration structure relative to the vehicle. For example, this information may include an orientation relative to a thrust axis and/or an axis of symmetry of the vehicle, and/or a distance from a reference element on the vehicle (the logo, for example).

The system comprises a positioning device. The positioning device includes a device target. The positioning device can be placed at an operating position spaced from the calibration structure, in front of the apparatus and/or alongside the first side of the vehicle, so that the device target is visible to the apparatus camera.

Preferably, the system satisfies at least one of the following conditions:
i) the calibration structure comprises a structure camera and the device target is visible to the structure camera, and/or (alternatively or in addition)
ii) the positioning device includes a device camera and the calibration structure comprises a structure target, visible to the device camera.

In an embodiment, the rear (or front) wheel target can be moved from the rear (or front) wheel to the structure and can thus perform both the function of rear (or front) wheel target and the function of structure target.

In an embodiment, the rear (or front) wheel target can be moved from the rear (or front) wheel to the positioning device and can thus perform both the function of rear (or front) wheel target and the function of device target.

In an embodiment, the system comprises an additional apparatus camera, mounted on the apparatus and configured to capture a second image. The system comprises an additional front wheel target and an additional rear wheel target, configured to be applied on an additional front wheel and on an additional rear wheel of the vehicle, respectively. The additional front wheel and the additional rear wheel are located on a second side of the vehicle, opposite to the first side.

In an embodiment, the system comprises an additional positioning device.

The additional positioning device comprises an additional device target.

The additional positioning device can be placed at an operating position spaced from the calibration structure, in front of the apparatus and/or alongside the second side of the vehicle. The additional positioning device can be placed in such a way that the additional device target is visible to the additional apparatus camera.

Thus, the second image includes the additional front wheel target, the additional rear wheel target and the additional device target. The control unit is configured to derive the information useful for positioning the calibration structure relative to the vehicle also as a function of the second image.

In an embodiment, the system comprises a rear calibration structure, which includes a rear calibration assistance device configured to calibrate a rear ADAS sensor of an advanced driver assistance system of the vehicle. In an embodiment, the positioning device comprises a rear device camera, oriented opposite to the device camera; the calibration structure includes a rear structure target, mounted on the rear calibration structure and visible to the rear device camera. Further, in an embodiment, the rear calibration structure may be provided with an additional rear structure camera, for viewing the rear device target (or an additional rear device target, oriented opposite to the additional device target).

This disclosure also provides a vehicle service system comprising the alignment measuring apparatus, the apparatus camera, the front and rear wheel targets, the control unit and the positioning device Including a device target visible to the apparatus camera.

In an embodiment, the positioning device includes a calibration assistance device (or a plurality of calibration assistance devices), configured to calibrate an ADAS sensor of an advanced driver assistance system of the vehicle; in particular, the calibration assistance device is configured for calibrating the ADAS sensor in an operative configuration wherein the device target is positioned in front of the apparatus and alongside the first side of the vehicle. More specifically, the calibration assistance device mounted on the positioning device is configured to calibrate a lateral ADAS sensor on the side of the vehicle (for example, a side camera or a side radar sensor). The calibration assistance device (or the plurality of calibration assistance devices) mounted on the positioning device may include a reflector, a mirror, a signal generating/simulation device for calibrating ADAS sensors (for example, a Doppler effect signal simulator), a prism and/or a panel having a respective combination of graphical features.

It should be noted that in the embodiment in which the positioning device is also provided with calibration devices, it is a calibration device as well as a positioning device: that is, a calibration device which, in order to be positioned, can interact with the apparatus cameras for measuring the alignment of the vehicle.

In this case, it should be noted that the calibration and positioning device could be used even without the calibration structure described above. In effect, the calibration and positioning device could be used to calibrate the lateral ADAS sensors and, if necessary, also the front and rear ADAS sensors, by moving it to different positions around the vehicle.

These and other features will become more apparent from the following detailed description of a preferred, non-limiting embodiment, illustrated by way of example in the accompanying drawings, in which:

FIG. 5 shows a calibration structure of the system of FIG. 1 (or of FIG. 2 or of FIG. 3);

Figure 1:
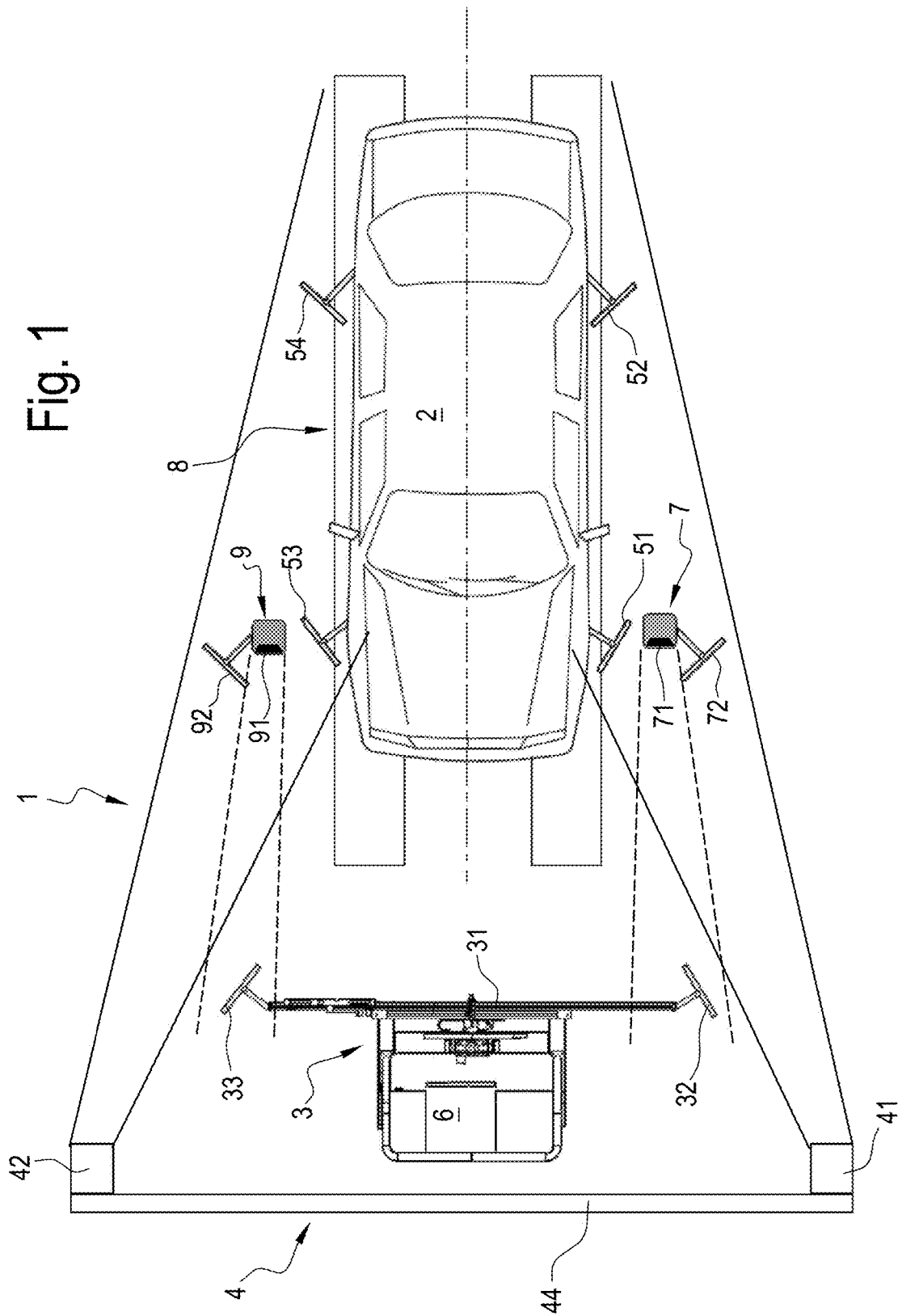
FIGS. 1, 2 and 3 show top views of a vehicle service system according to respective embodiments of this disclosure.
Figure 2:
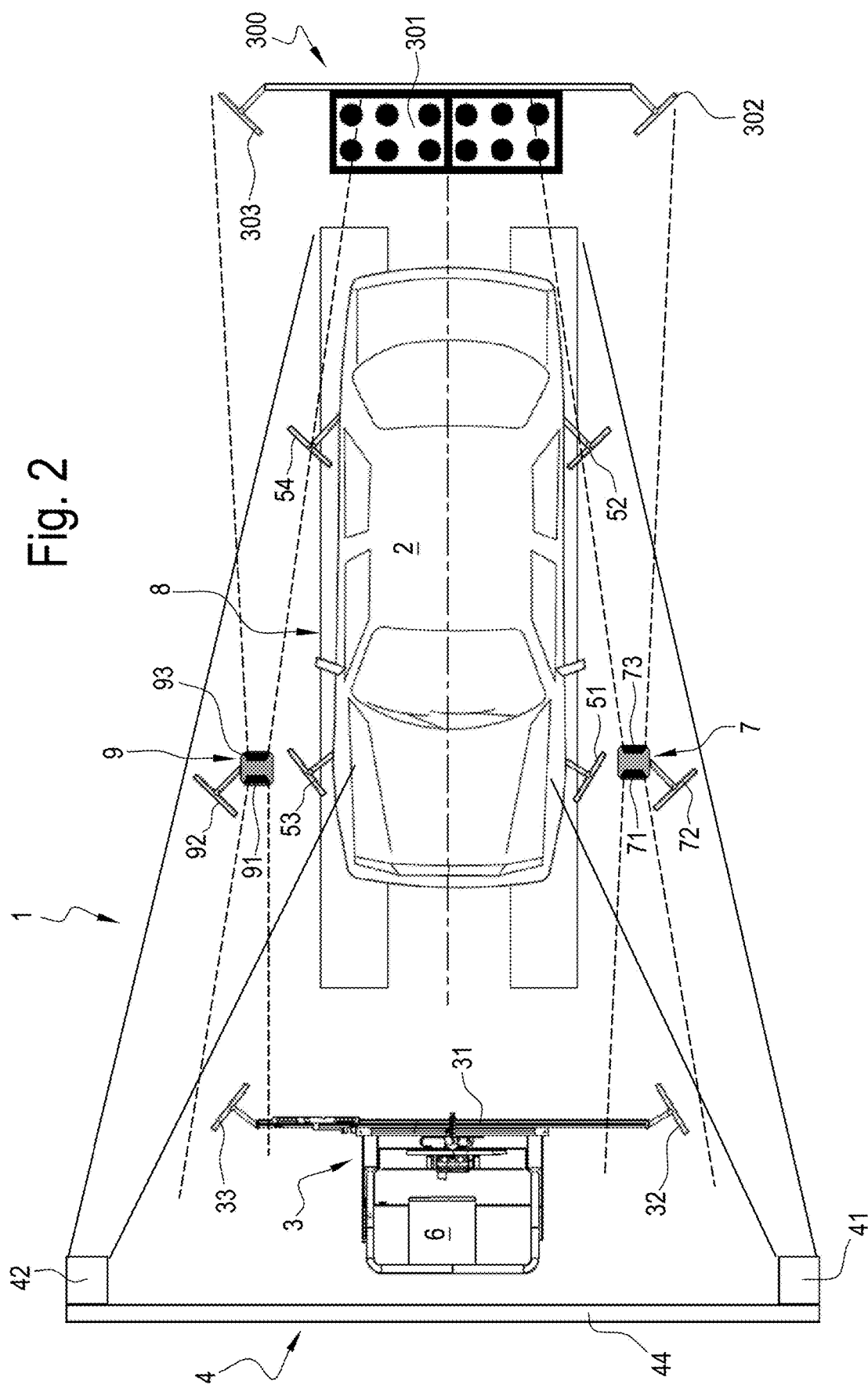
Figure 3:
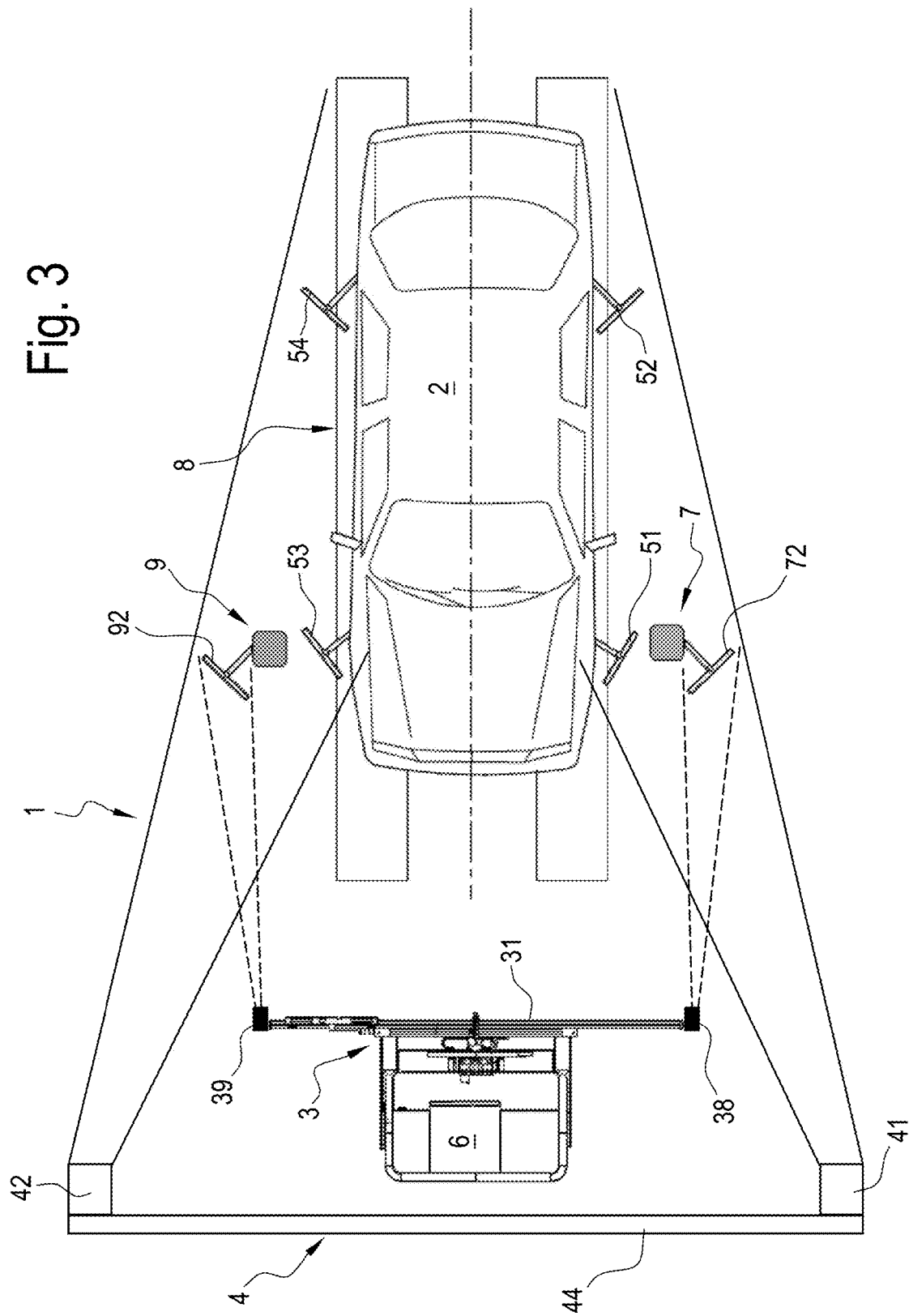
Figure 4:
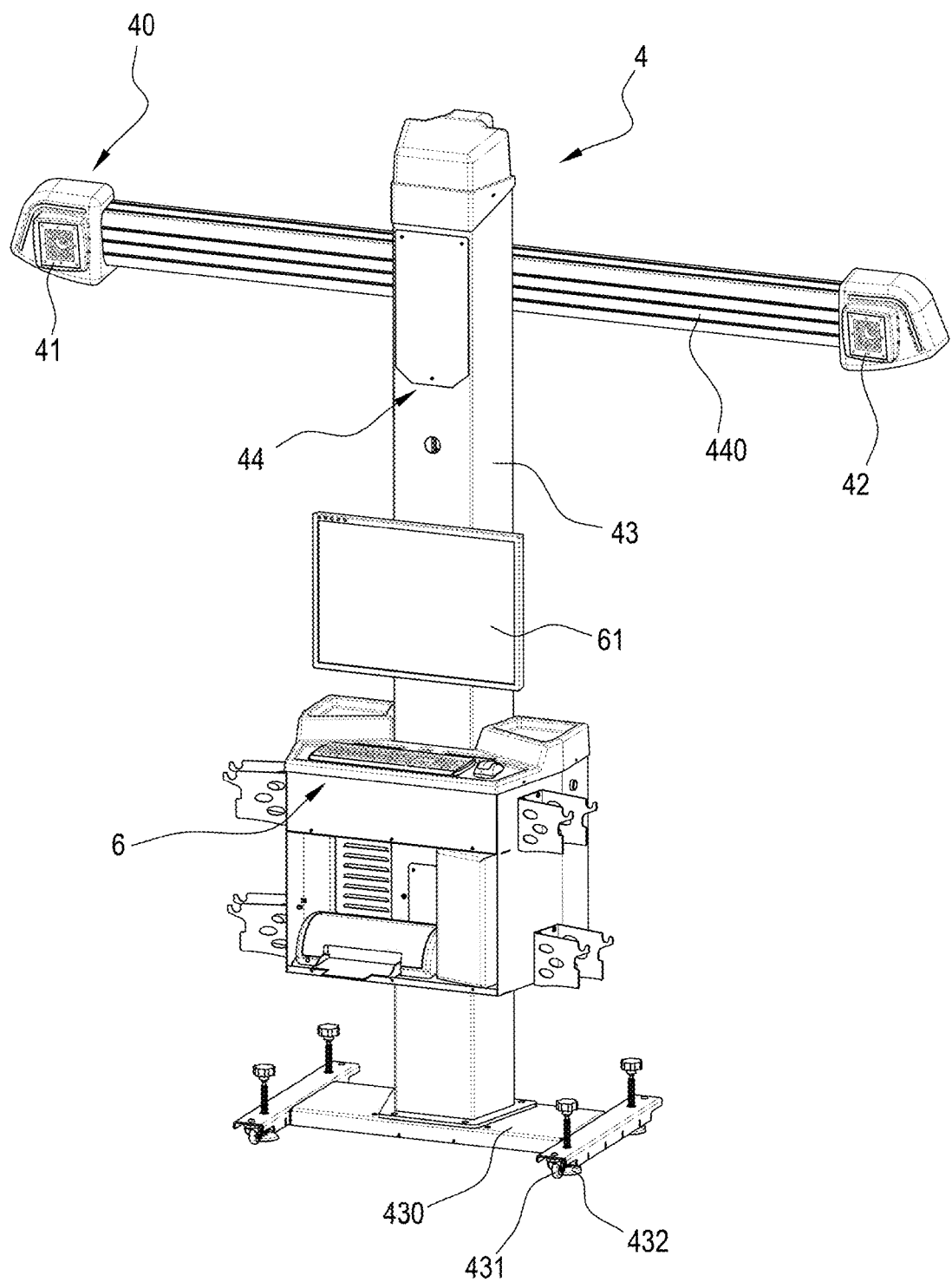
FIG. 4 shows an embodiment of the apparatus of the system of FIG. 1 (or of FIG. 2 or of FIG. 3)
Figure 7:
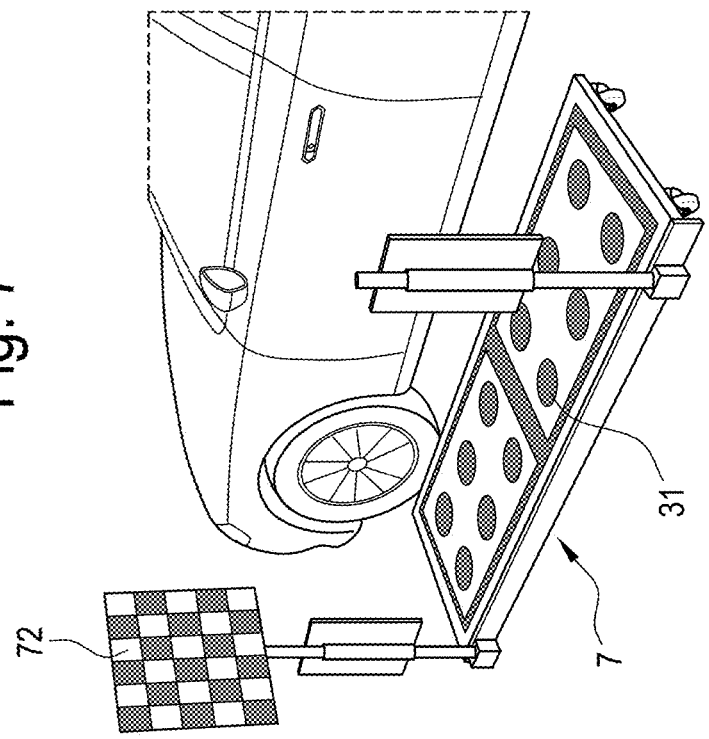
FIGS. 6 and 7 show possible embodiments of the positioning device of the system of FIG. 1.
Figure 6:
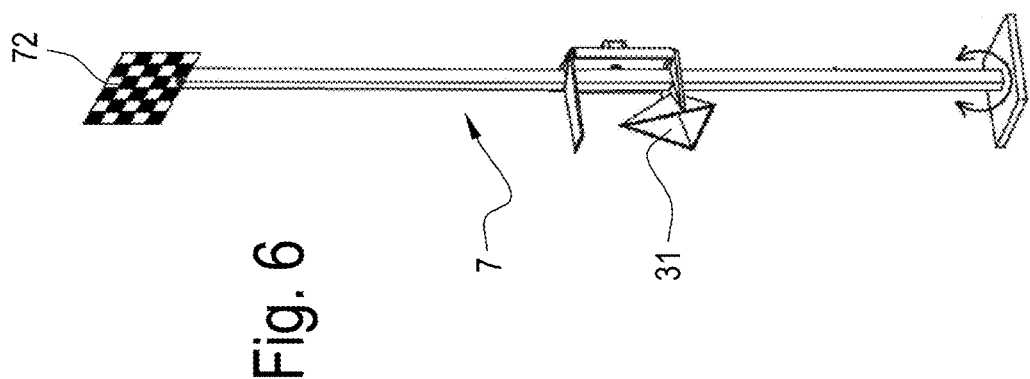

With reference to the accompanying drawings, the numeral 1 denotes a vehicle service system. Further, the numeral 2 denotes a vehicle.

The system 1 comprises a calibration structure 3. The calibration structure 3 includes a calibration assistance device 31, configured to calibrate an ADAS sensor of an advanced driver assistance system of the vehicle 2.

The calibration structure 3 includes a structure target 32. During calibration, the vehicle 2 is positioned in a service area 8 and the calibration structure 3 is located at a position in front of (or behind) the vehicle 2.

The system 1 includes an apparatus 4 for measuring the alignment of the vehicle 2. The vehicle 2 may be a motor car, or a van, or a coach, or a lorry, or other vehicle.

The apparatus 4 comprises a camera 41. It should be noted that, in an embodiment, the apparatus 4 comprises an additional camera 42. In an embodiment, the apparatus 4 comprises a frame 44. The additional camera 42 and the camera 41 are both associated with the frame 44.

More specifically, the frame 44 comprises a supporting bar 43, oriented vertically (in a direction parallel to gravity). The frame 44 also comprises a horizontal bar 440, mounted on the supporting bar 43 and oriented perpendicularly to the supporting bar 43. The horizontal bar 440 extends between two opposite ends; the camera 41 and the additional camera 42 are disposed at the opposite ends of the horizontal bar 440. The apparatus 4 preferably also includes a base unit 430 on which the frame 44 is mounted. More specifically, the supporting bar 43 is mounted on the base unit 430. The base unit 430 includes a plurality of wheels 431. The base unit 430 may also include a plurality of stabilizer feet 432, movable between a rest position and an operating position; when the stabilizer feet 432 are at the rest position, the base unit 430 is movable on the wheels 431; when the stabilizer feet 432 are at the operating position, on the other hand, they prevent the base unit 430 from moving on the wheels 431.

In an embodiment, the calibration structure 3 includes an additional structure target 33. The calibration structure includes a frame. The frame includes a horizontal bar 37; preferably, the structure target 32 and the additional structure target 33 are mounted at opposite ends of the horizontal bar 37. It should be noted that the position of the structure target 32 and the position of the additional structure target 33 are preferably predetermined relative to the horizontal bar 37, hence relative to the calibration assistance device 31. Preferably, the frame includes a handle 36 which is grippable by an operator to move the structure 3. The structure 3 includes a base unit 34 on which the frame is mounted. The base unit 34 includes a plurality of wheels 35. The base unit 34 may also include a plurality of stabilizer feet (not illustrated), movable between a rest position and an operating position; when the stabilizer feet are at the rest position, the base unit 34 is movable on the wheels 35; when the stabilizer feet are at the operating position, on the other hand, they prevent the base unit 34 from moving on the wheels 35.

In an embodiment, the calibration structure 3 comprises a structure camera 38; the calibration structure 3 also comprises an additional structure camera 39. The structure camera 38 and the additional structure camera 39 are mounted at opposite ends of the horizontal bar 37. It should be noted that the position of the structure camera 38 and the position of the additional structure camera 39 are preferably predetermined relative to the horizontal bar 37, hence relative to the calibration assistance device 31.

The system 1 comprises a control unit 6, including a user interface 61 to communicate with an operator. In an embodiment, the control unit 6 (and the user interface 61) is located on the structure 3.

The system 1 comprises a front wheel target 51 and a rear wheel target 52 applicable on a front wheel and on a rear wheel located on a first side of the vehicle 2.

In an embodiment, the system comprises an additional front wheel target 53 and an additional rear wheel target 54 applicable on an additional front wheel and on an additional rear wheel of the vehicle 2, located on a second side of the vehicle 2. It should be noted that the wheel targets 51, 52, 53, 54 bear combinations of graphical features; the combinations of graphical features appearing on the wheel targets 51, 52, 53, 54 may be identical.

The optical device (comprising the camera 41 and 42) is configured to view the front wheel target 51 and the rear wheel target 52 in order to make alignment measurements. The optical device is also configured to view the additional front wheel target 53 and the additional rear wheel target 54.

The system 1 comprises a positioning device 7 and, preferably, an additional positioning device 9. The positioning device 7 includes a device target 72. The additional positioning device 9 comprises an additional device target 92.

This disclosure also provides a method for aligning (that is, positioning) the vehicle service system 1 relative to the vehicle 2 positioned in the service area.

The method comprises a step of applying the front wheel target 51 on the front wheel on the first side of the vehicle 2. The method comprises a step of applying the rear wheel target 52 on the rear wheel on the first side of the vehicle.

The method comprises a step of applying the additional front wheel target 53 on the front wheel on the second side of the vehicle 2. The method comprises a step of applying the additional front wheel target 54 on the front wheel on the second side of the vehicle 2.

The method comprises a step of positioning the apparatus 4 at a position in front of the vehicle.

The method comprises a step of placing the positioning device 7 at an operating position, spaced from the structure 3, in front of the apparatus 4 and alongside the first side of the vehicle 2. The method comprises a step of placing the additional positioning device 9 at an operating position, spaced from the structure 3, in front of the apparatus 4 and alongside the second side of the vehicle 2.

The method comprises a step of capturing a first image through the apparatus camera 41. The first image represents the front wheel target 51, the rear wheel target 52 and the device target 72. The first image allows identifying the relative position between the apparatus 4 and the positioning device 7.

The method may comprise a step of capturing a second image through the additional camera 42. The second image represents the additional front wheel target 53, the additional rear wheel target 54 and the additional device target 92. The second image allows identifying the relative position between the apparatus 4 and the additional positioning device 9.

The method may comprise a step of capturing a third image through the structure camera 38. The third image represents the device target 72.

The positioning device 7 may also include a device camera 71.

The method may comprise a step of capturing a fourth image through the device camera 71, where the fourth image represents the device target 72.

The third image and/or the fourth image allow deriving the relative position between the structure 3 (specifically, the calibration assistance device 31) and the positioning device 7.

The additional positioning device 9 may also include an additional device camera 91.

The method may comprise a step of capturing a fifth image through the additional structure camera 39. The fifth image represents the additional positioning device target 92.

The method may comprise a step of capturing a sixth image through the additional device camera 91. The sixth image represents the additional structure target 33. The fifth image and/or the sixth image allow deriving the relative position between the structure 3 and the additional positioning device 9.

The system 1 may comprise a rear calibration structure 300, placeable at a position behind the vehicle 2. The rear calibration structure 300 includes a rear calibration assistance device 301, configured to calibrate an ADAS sensor of the vehicle 2, located at the back of the vehicle 2. The rear calibration structure 300 may have a rear structure target 302 and an additional rear structure target 303 mounted on it.

The positioning device 7 may include a rear device camera 73 (which may be provided in addition or alternatively to the camera 71). The additional positioning device 9 may also include a rear additional positioning device camera 93.

The method may comprise a step of capturing a seventh image through the rear device camera 73. The seventh image represents the rear structure target 302.

The method may comprise a step of capturing an eighth image through the rear additional device camera 93. The eighth image represents the rear additional structure target 303. The seventh image allows deriving the relative position between the positioning device and the rear calibration structure. The eighth image allows deriving the relative position between the additional positioning device and the rear calibration structure.

In an embodiment not illustrated, the positioning device 7 and the additional positioning device 9 may each also include a respective rear target, and the rear calibration structure 300 may include a pair of rear structure cameras which capture a ninth and a tenth image representing the rear targets of the positioning device 7 and additional positioning device 9, respectively. The ninth and tenth images allow identifying the relative position between the rear calibration structure 300 and the positioning device 7 and additional positioning device 9, respectively, it should also be noted that the structure target 32 and the additional structure target 33 may, in one embodiment, coincide with the rear wheel target 52 and the additional rear wheel target 54, respectively: in effect, after capturing the first image data, the operator can transfer the rear wheel target 52 and the additional rear wheel target 54 to the structure 3. That way, the system 1 includes a smaller number of targets.

In an embodiment, the positioning device 7 includes a calibration assistance device 31, for calibrating a lateral ADAS sensor of the vehicle.

The calibration assistance device 31 may include a prism (or a mirror) and/or a panel and/or a platform. Preferably, the positioning device 7 is movable on wheels. In an embodiment, the panel and/or the platform bears a combination of graphical features. In an embodiment, the calibration assistance device 31 may include a Doppler simulator. It should be noted that the device target 72, connected to the positioning device 7, is in predetermined geometrical relation with the calibration assistance device 31 and is preferably located at a level above the calibration assistance device 31 (so it can be viewed better by the cameras 41 and 42 of the apparatus 4): for example, it might be mounted on a (vertically oriented) arm.

Lastly, it should be noted that what is described in connection with the calibration of the rear ADAS sensors also applies, with the necessary changes made, to the calibration of lateral ADAS sensors (cameras in particular). More specifically, the system may include a side calibration structure placeable at a position alongside the vehicle 2. The side calibration structure includes a side calibration assistance device, configured to calibrate an ADAS sensor of the vehicle 2, located on the right- or left-hand side of the vehicle 2. The side calibration structure may have a side structure target and (optionally) an additional side structure target mounted on it.

The positioning device 7 may include a side device camera (which may be provided in addition or alternatively to the device camera 71 and to the rear device camera 73). The additional positioning device 9 may also include a side additional positioning device camera.

The method may comprise a step of capturing an eleventh image through the side device camera. The eleventh image represents the side structure target.

The method may comprise a step of capturing a twelfth image through the side additional device camera. The twelfth image represents the side additional structure target. The eleventh image allows deriving the relative position between the positioning device and the side calibration structure.

The twelfth image allows deriving the relative position between the additional positioning device and the side calibration structure.

In an embodiment, the positioning device 7 and the additional positioning device 9 may each also include a respective side target, and the side calibration structure may include a pair of side structure cameras which capture a thirteenth and a fourteenth image representing the side targets of the positioning device 7 and additional positioning device 9, respectively. The thirteenth and fourteenth images allow identifying the relative position between the side calibration structure and the positioning device 7 and between the side calibration structure and the additional positioning device 9, respectively.

The invention claimed is:

1. A method for aligning a vehicle service system relative to a vehicle positioned in a service area, wherein the vehicle service system comprises:
    a calibration structure including a calibration assistance device, configured to calibrate an ADAS sensor of an advanced driver assistance system of the vehicle;
    an apparatus for measuring the alignment of the vehicle and on which an apparatus camera for capturing images is mounted;
    the method comprising the following steps:
        applying a front wheel target and a rear wheel target on a front wheel and on a rear wheel of the vehicle, respectively, wherein the front wheel and the rear wheel are located on a first side of the vehicle;
        positioning the calibration structure and the apparatus at a position in front of the vehicle;
        capturing an image through the apparatus camera, wherein the image represents the front wheel target and the rear wheel target;
        processing the image to derive information useful for positioning the calibration structure relative to the vehicle,
    characterized in that the method further comprises the following steps:
        placing a positioning device at an operating position, spaced from the calibration structure, in front of the apparatus and alongside the first side of the vehicle, wherein a device target is mounted on the positioning device;
        viewing the device target mounted on the positioning device, through the apparatus camera;
        viewing the device target, through a structure camera which is associated with the calibration structure,
    wherein the device target is connected to the positioning device and the device target is in predetermined geometrical relation with the calibration assistance device, and the positioning device includes a vertical shaft, and
    wherein the device target is mounted on the shaft and includes a flat panel provided with a plurality of dark areas and with a plurality of light areas, the dark areas being alternate and adjacent to the light areas to define a predetermined pattern.

2. The method according to claim 1, wherein an additional apparatus camera is mounted on the apparatus and wherein the method further comprises the following steps:
    applying an additional front wheel target and an additional rear wheel target on an additional front wheel and on an additional rear wheel of the vehicle, respectively, wherein the additional front wheel and the additional rear wheel are located on a second side of the vehicle, opposite to the first side;

placing an additional positioning device at an additional operating position, spaced from the calibration structure, in front of the apparatus and alongside the second side of the vehicle,
wherein an additional device target is mounted on the additional positioning device;
capturing a second image through the additional camera, wherein the second image represents the additional front wheel target and the additional rear wheel target;
viewing the additional device target through the additional apparatus camera.

3. The method according to claim 2, wherein an additional structure target, visible to an additional device camera mounted on the additional positioning device, is mounted on the calibration structure,
wherein the method further comprises a step of viewing the additional structure target through the additional device camera.

4. The method according to claim 1, comprising, after the step of capturing the image, a step of moving the front wheel target or the rear wheel target onto the positioning device, to define the device target.

5. The method according to claim 1 comprising, after the step of capturing the image, a step of moving the front wheel target or the rear wheel target onto the structure, to define the structure target.

6. The method according to claim 1, wherein the device camera is at a predetermined position relative to the device target.

7. The method according to claim 1, wherein the calibration assistance device includes a calibration panel positioned at a predetermined position relative to the structure target.

8. The method according to claim 1, wherein a rear device camera oriented opposite to the device camera is mounted on the positioning device, and wherein the method further comprises the following steps:
positioning a rear calibration structure at a position behind the vehicle, so that the vehicle is interposed between the apparatus and the rear calibration structure, wherein the rear calibration structure includes a rear calibration assistance device, configured to calibrate a rear ADAS sensor of an advanced driver assistance system of a vehicle, and wherein a rear target structure is mounted on the rear calibration structure;
viewing the rear structure target through the rear device camera.

9. The method according to claim 1, wherein the device target is a three-dimensional target, including a first face, which is viewed by the camera of the apparatus, and a second face, which is viewed by the structure camera.

10. The method according to claim 1, wherein the device target includes a first panel, which is viewed by the camera of the apparatus, and a second panel, which is viewed by the structure camera.

11. A vehicle service system, comprising:
a calibration structure including a calibration assistance device, configured to calibrate an ADAS sensor of an advanced driver assistance system of the vehicle;
an apparatus for measuring the alignment of the vehicle;
an apparatus camera, mounted on the apparatus, for capturing images;
a front wheel target and a rear wheel target, bearing respective combinations of graphical features and configured to be applied on a front wheel and on a rear wheel of the vehicle, respectively, wherein the front wheel and the rear wheel are located on a first side of the vehicle;
a control unit, configured to process an image representing the front wheel target and the rear wheel target and captured by the apparatus camera at an operating configuration in which the apparatus is in front of the vehicle and wherein the control unit is configured to derive, as a function of that image, information useful for positioning the calibration structure relative to the vehicle,
characterized in that it further comprises a positioning device which includes a device target and which can be placed at an operating position spaced from the calibration structure, in front of the apparatus and alongside the first side of the vehicle, so that the device target is visible to the apparatus camera, wherein:
the positioning device includes a device camera and the calibration structure comprises a structure target, visible to the device camera.

12. The system according to claim 11, comprising:
an additional apparatus camera, mounted on the apparatus and configured to capture a second image;
an additional front wheel target and an additional rear wheel target configured to be applied on an additional front wheel and on an additional rear wheel of the vehicle, respectively, wherein the additional front wheel and the additional rear wheel are located on a second side of the vehicle, opposite to the first side;
an additional positioning device, comprising an additional device target, wherein the additional positioning device is placeable at an operating position which is spaced from the calibration structure, in front of the apparatus and alongside the second side of the vehicle, so that the additional device target is visible to the additional apparatus camera,
wherein the second image includes the additional front wheel target, the additional rear wheel target and the additional device target,
wherein the control unit is configured to derive the information useful for positioning the calibration structure relative to the vehicle also as a function of the second image.

13. The system according to claim 11, wherein the device target is a three-dimensional target, including a first face, which is viewed by the camera of the apparatus, and a second face, which is viewed by the structure camera.

14. The system according to claim 11, wherein the device target includes a first panel, which is viewed by the camera of the apparatus, and a second panel, which is viewed by the structure camera.

15. The system according to claim 11, comprising a rear calibration structure, which includes a rear calibration assistance device configured to calibrate a rear ADAS sensor of an advanced driver assistance system of the vehicle.

16. The system according to claim 15, wherein the positioning device comprises a rear device camera oriented opposite to the device camera, and wherein the rear calibration structure comprises a rear structure target, mounted on the rear calibration structure and visible to the rear device camera.

17. A vehicle service system, comprising:
an apparatus for measuring the alignment of the vehicle;
an apparatus camera, mounted on the apparatus, for capturing images;
a front wheel target and a rear wheel target, bearing respective combinations of graphical features and configured to be applied on a front wheel and on a rear wheel of the vehicle, respectively, wherein the front wheel and the rear wheel are located on a first side of the vehicle;

a control unit, configured to process an image representing the front wheel target and the rear wheel target and captured by the apparatus camera at an operating configuration in which the apparatus is in front of the vehicle;

a positioning device which includes a device target and which can be placed at an operating position in front of the apparatus and alongside the first side of the vehicle, so that the device target is visible to the apparatus camera, wherein the positioning device includes a calibration assistance device, configured to calibrate an ADAS sensor of an advanced driver assistance system of the vehicle in an operative configuration wherein the device target is positioned in front of the apparatus and alongside the first side of the vehicle, wherein:

the control unit is configured to derive, as a function of the image, information useful for positioning the calibration assistance device relative to the vehicle;

the device target is connected to the positioning device and the device target is in predetermined geometrical relation with the calibration assistance device;

the positioning device includes a vertical shaft; and the device target is mounted on the shaft and includes a flat panel provided with a plurality of dark areas and with a plurality of light areas, the dark areas being alternate and adjacent to the light areas to define a predetermined pattern.

18. The vehicle service system according to claim 17, comprising:

an additional apparatus camera mounted on the apparatus, an additional front wheel target and an additional rear wheel target configured to be applied on an additional front wheel and on an additional rear wheel of the vehicle, respectively, wherein the additional front wheel and the additional rear wheel are located on a second side of the vehicle, opposite to the first side, an additional positioning device, comprising an additional device target, wherein the additional positioning device is placeable at an operating position which is spaced from the calibration structure, in front of the apparatus and alongside the second side of the vehicle, so that the additional device target is visible to the additional apparatus camera, wherein the additional positioning device includes an additional calibration assistance device, configured to calibrate an additional ADAS sensor of an advanced driver assistance system of the vehicle in an operative configuration wherein the additional device target is positioned in front of the apparatus and alongside the second side of the vehicle.

19. The vehicle service system according to claim 17 or 18, comprising a rear calibration structure, which includes a rear calibration assistance device configured to calibrate a rear ADAS sensor of an advanced driver assistance system of the vehicle.

20. The vehicle service system according to claim 19, wherein the positioning device comprises a device camera and a rear device camera oriented opposite to the device camera, and wherein the rear calibration structure comprises a rear structure target, mounted on the rear calibration structure and visible to the rear device camera.

21. A method for aligning a vehicle service system relative to a vehicle positioned in a service area, wherein the vehicle service system comprises:

a calibration structure including a calibration assistance device, configured to calibrate an ADAS sensor of an advanced driver assistance system of the vehicle;

an apparatus for measuring the alignment of the vehicle and on which an apparatus camera for capturing images is mounted;

the method comprising the following steps:

applying a front wheel target and a rear wheel target on a front wheel and on a rear wheel of the vehicle, respectively, wherein the front wheel and the rear wheel are located on a first side of the vehicle;

positioning the calibration structure and the apparatus at a position in front of the vehicle;

capturing an image through the apparatus camera, wherein the image represents the front wheel target and the rear wheel target;

processing the image to derive information useful for positioning the calibration structure relative to the vehicle, characterized in that the method further comprises the following steps:

placing a positioning device at an operating position, spaced from the calibration structure, in front of the apparatus and alongside the first side of the vehicle, wherein a device target is mounted on the positioning device;

viewing the device target mounted on the positioning device, through the apparatus camera;

viewing a structure target associated with the calibration structure, through a device camera which is associated with the positioning device.

* * * * *